United States Patent
Kale et al.

(10) Patent No.: US 11,640,436 B2
(45) Date of Patent: May 2, 2023

(54) METHODS AND SYSTEMS FOR QUERY SEGMENTATION

(71) Applicant: eBay Inc., San Jose, CA (US)

(72) Inventors: Ajinkya Gorakhnath Kale, San Jose, CA (US); Thrivikrama Taula, San Jose, CA (US); Amit Srivastava, San Jose, CA (US); Sanjika Hewavitharana, Milpitas, CA (US)

(73) Assignee: eBay Inc., San Jose, CA (US)

( * ) Notice: Subject to any disclaimer, the term of this patent is extended or adjusted under 35 U.S.C. 154(b) by 212 days.

(21) Appl. No.: 15/681,663

(22) Filed: Aug. 21, 2017

(65) Prior Publication Data

US 2018/0329999 A1    Nov. 15, 2018

Related U.S. Application Data

(60) Provisional application No. 62/506,132, filed on May 15, 2017.

(51) Int. Cl.
*G06F 16/9535* (2019.01)
*G06N 5/02* (2023.01)
(Continued)

(52) U.S. Cl.
CPC ...... *G06F 16/9535* (2019.01); *G06F 16/2455* (2019.01); *G06F 16/3334* (2019.01);
(Continued)

(58) Field of Classification Search
None
See application file for complete search history.

(56) References Cited

U.S. PATENT DOCUMENTS

| 5,671,333 A * | 9/1997 | Catlett | G06N 20/00 706/12 |
| 6,236,991 B1 * | 5/2001 | Frauenhofer | G06F 16/9535 707/709 |

(Continued)

FOREIGN PATENT DOCUMENTS

| CN | 1784653 A | 6/2006 |
| CN | 1954321 A | 4/2007 |

(Continued)

OTHER PUBLICATIONS

Kudela, "Mining Parallel Corpora from the Web;" Department of Software Engineering, Prague, May 12, 2016; https://dspace.cuni.cz/bitstream/handle/20.500.11956/31195/RPTX_2015_2_11320_0_511359_0_180664.pdf?sequence=1 (Year: 2016).*

(Continued)

*Primary Examiner* — Ashish Thomas
*Assistant Examiner* — Mellissa M. Ohba
(74) *Attorney, Agent, or Firm* — Shook, Hardy & Bacon L.L.P.

(57) ABSTRACT

A query segmentation system segments a search query into a query segment that identifies search results from items stored on a database. The query segmentation system receives a query string, and the query string comprises a plurality of tokens. A first token and a second token are identified from the plurality of tokens, and a first vector and a second vector associated with the first token and the second token respectively are determined. The query segmentation system determines whether to include the first and second tokens in a single query segment based on the first and second vectors. The single query segment is processed to identify the search results from the database.

18 Claims, 11 Drawing Sheets

(51) Int. Cl.
  *G06F 16/2455* (2019.01)
  *G06F 16/33* (2019.01)
  *G06N 3/08* (2023.01)
  *G06N 5/01* (2023.01)
(52) U.S. Cl.
  CPC ............ *G06N 3/08* (2013.01); *G06N 5/01* (2023.01); *G06N 5/02* (2013.01)

(56) References Cited

U.S. PATENT DOCUMENTS

| | | | |
|---|---|---|---|
| 6,363,373 | B1 | 3/2002 | Steinkraus |
| 7,326,848 | B2* | 2/2008 | Weare ............... G11B 27/105 84/668 |
| 9,037,589 | B2* | 5/2015 | Anderson ............ G06F 16/285 707/737 |
| 9,342,602 | B2 | 5/2016 | Kraft et al. |
| 2006/0212433 | A1 | 9/2006 | Stachowiak et al. |
| 2007/0124301 | A1 | 5/2007 | Elbaz et al. |
| 2007/0136256 | A1* | 6/2007 | Kapur ................. G06F 16/367 |
| 2009/0171955 | A1* | 7/2009 | Merz ................ G06F 16/24558 |
| 2010/0138271 | A1* | 6/2010 | Henkin ............. G06Q 30/0256 705/14.54 |
| 2010/0138451 | A1* | 6/2010 | Henkin ................ G06Q 30/02 707/803 |
| 2010/0138452 | A1* | 6/2010 | Henkin ................ G06Q 30/02 707/803 |
| 2010/0191740 | A1 | 7/2010 | Lu et al. |
| 2010/0205198 | A1* | 8/2010 | Mishne .............. G06F 16/3346 707/759 |
| 2011/0314011 | A1* | 12/2011 | Buehrer ............... G06F 16/951 707/728 |
| 2012/0278339 | A1 | 11/2012 | Wang |
| 2013/0124474 | A1 | 5/2013 | Anderson |
| 2014/0337371 | A1* | 11/2014 | Li ..................... G06F 16/90324 707/767 |
| 2016/0041984 | A1 | 2/2016 | Kaneda |
| 2016/0189047 | A1 | 6/2016 | Meij et al. |
| 2016/0275148 | A1 | 9/2016 | Jiang |
| 2017/0109355 | A1 | 4/2017 | Li et al. |
| 2017/0278510 | A1 | 9/2017 | Zhao et al. |
| 2018/0232443 | A1* | 8/2018 | Delgo .................... G06F 16/35 |
| 2019/0207946 | A1* | 7/2019 | Mertens ............... H04L 63/102 |

FOREIGN PATENT DOCUMENTS

| | | |
|---|---|---|
| CN | 106462630 A | 2/2017 |
| JP | 2007-156932 A | 6/2007 |
| JP | 2007512609 A | 5/2017 |
| KR | 10-2014-0094003 A | 7/2014 |
| KR | 10-2017-0045135 A | 4/2017 |
| WO | 2005/050472 A2 | 6/2005 |
| WO | 2013/074774 A1 | 5/2013 |
| WO | 2018/009490 A1 | 1/2018 |
| WO | 2018/212995 A1 | 11/2018 |

OTHER PUBLICATIONS

International Written Opinion received for PCT Patent Application No. PCT/US2018/030618, dated Jul. 9, 2018, 3 pages.
International Search Report received for PCT Patent Application No. PCT/US2018/030618, dated Jul. 9, 2018, 3 pages.
Tunkelang, "Query Segmentation", Retrieved from the Internet URL : <https://queryunderstanding.com/query-segmentation-2cf860ade503>, Apr. 29, 2017, 4 pages.
International Preliminary Report on Patentability received for PCT Application No. PCT/US2018/030618, dated Nov. 28, 2019, 10 pages.
Office Action Received for Korean Patent Application No. 10-2019-7033803 dated Feb. 15, 2021, 11 pages (5 pages of Official and 6 pages of English Translation).
Extended European Search Report received for European Patent Application No. 18801540.8 dated Dec. 8, 2020, 9 pages.
Beomsu, "Word2vec Related Theory", Retrieved from the Internet URL :<https://shuuki4.wordpress.com/2016/01/27/word2vec-%EA%B4%80%EB%A0%A8-%EC%9D%B4%EB%A1%A0-%EC%A0%95%EB%A6%AC>, Jan. 27, 2016, 14 pages.
Wikipedia, "Word2vec", Retrieved from the Internet URL : <https://en.wikipedia.org/wiki/Word2veo, Accessed on Sep. 27, 2021, 6 pages.
Communication Pursuant to Article 94(3) EPC received for European Patent Application No. 18801540.8, dated Dec. 15, 2021, 8 pages.
Notice of Allowance Received for Korean Patent Application No. 10-2019-7033803, dated Feb. 22, 2022, 5 pages (2 pages of English translation and 3 pages of official).
Office Action received for Korean Patent Application No. 10-2019-7033803, dated Aug. 19, 2021, 7 pages(6 pages of official and 1 page of English translation).
Office Action received for Chinese Patent Application No. 201880032109.X, dated Nov. 3, 2022, 9 pages. (1 page of English Translation & 8 pages of Official Copy).

* cited by examiner

METHODS AND SYSTEMS FOR QUERY SEGMENTATION

CROSS REFERENCE TO RELATED APPLICATIONS

This application claims priority to U.S. Provisional Application No. 62/506,132, filed May 15, 2017 and entitled "METHODS AND SYSTEMS FOR QUERY SEGMENTATION." The content of this prior application is considered part of this application, and is hereby incorporated by reference in its entirety.

TECHNICAL FIELD

The present disclosure generally relates to text processing, and specifically to the processing of search queries.

BACKGROUND

As use of the Internet has become more pervasive across the globe, queries for information are becoming central to accessing many Internet based services. These services may segment the query to improve an accuracy of a resulting search. For example, an online shopper may enter a query such as "long sleeve summer dress" when shopping online. The shopper may not be looking for a long dress, although both the words "long" and "dress" are included in the query. Instead, "long" may be best associated with "sleeve" when the query is processed. To the extent a query processor accurately determines the proper associations between tokens within a query, the resulting search results may be more likely to meet the user's needs.

A segmented query may also be utilized for additional back-end processing activities, further emphasizing the importance of accurate query segmentation. For example, the segmented query may determine head or dominant object detection (i.e. "dress"), aspect prediction, and query fragment detection. Due to the importance of proper query segmentation, further technical improvements to the accuracy of query segmentation are needed.

SUMMARY

Query Segmentation is one component of understanding a user's intent for an information retrieval task. Query segmentation separates tokens in a search query into meaningful phrases of words which help downstream tasks improve relevance. The disclosed methods and systems provide a more accurate and effective query segmentation solution by using a word embeddings model. The disclosed methods and systems provide superior effectiveness when compared to other segmentation techniques. This effectiveness is also demonstrated using a training data set comprised of three months of query records from eBay.

One aspect disclosed is a method of segmenting a query. The method includes receiving, by one or more hardware processors, a query string, the query string comprising a plurality of tokens, identifying, by the one or more hardware processors, a first token and a second token from the plurality of tokens, determining, by the one or more hardware processors, a first vector and a second vector associated with the first token and the second token respectively, determining, by the one or more hardware processors, whether to include the first and second tokens in a single query segment based on the first and second vectors; generating, by the one or more hardware processors, a plurality of query segments including the single query segment based on the determination; and processing, by the one or more hardware processors, the query based on the plurality of query segments.

Some aspects of the method also include generating a feature by concatenating thee first vector and the second vector, determining whether to include the first and second tokens in a single query segment by passing the feature to a binary classifier and receiving an indication of whether the first and second tokens are in the single query segment from the binary classifier. In some aspects, the method also includes building a vector model based on a plurality of training queries to generate model data including the first and second vectors. In some aspects, the vector model is a word2vec or GloVe model. In some aspects, the method includes training a classifier based on the model data, wherein the determining of whether to include the first and second tokens in a single query segment is based on the trained classifier. In some of these aspects, the method also includes training the classifier based on annotation data defining segmentation of the training queries. In some aspects, the processing comprises searching a database based on the plurality of query segments.

Another aspect disclosed is an apparatus for segmenting a query. The apparatus includes one or more hardware processors, configured to receive a query string, the query string comprising a plurality of tokens, identify a first token and a second token from the plurality of tokens, determine a first vector and a second vector associated with the first token and the second token respectively, determine whether to include the first and second tokens in a single query segment based on the first and second vectors, generate a plurality of query segments based on the determination and process the query based on the plurality of query segments. In some aspects, the one or more hardware processors are further configured to build a vector model based on a plurality of training queries to generate model data including the first and second vectors. In some aspects, the vector model is a word2vec or GloVe model.

In some aspects, the one or more hardware processors are further configured to pad the first vector and the second vector to generate first and second features respectively, wherein the determination of whether to include the first and second tokens in a single query segment is based on the first and second features. In some aspects, the one or more hardware processors are further configured to train a classifier based on the model data, wherein the determining of whether to include the first and second tokens in a single query segment is based on the trained classifier. In some aspects, the one or more hardware processors are further configured to train the classifier based on annotation data defining segmentation of the training queries. In some aspects, the one or more hardware processors are further configured to limit the identification of the first and second tokens to adjacent tokens in the plurality of tokens. In some aspects, the processing comprises searching a database based on the plurality of query segments. In some of these aspects, the processing comprises identifying a dominant query segment of the plurality of query segments, and searching a database based on the dominant query segment. In some aspects of the apparatus, the one or more hardware processors are further configured to identify the first and second tokens in the query string based on one or more token delimiting characters between the first token and the second token.

Another aspect disclosed is a a non-transitory computer readable medium comprising instructions that when executed configure one or more hardware processors to perform a method of segmenting a query. The method includes receiving, by one or more hardware processors, a query string, the query string comprising a plurality of tokens, identifying, by the one or more hardware processors, a first token and a second token from the plurality of tokens, determining, by the one or more hardware processors, a first vector and a second vector associated with the first token and the second token respectively, determining whether to include the first and second tokens in a single query segment based on the first and second vectors, generating a plurality of query segments based on the determination, and processing, by the one or more hardware processors, the query based on the plurality of query segments.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
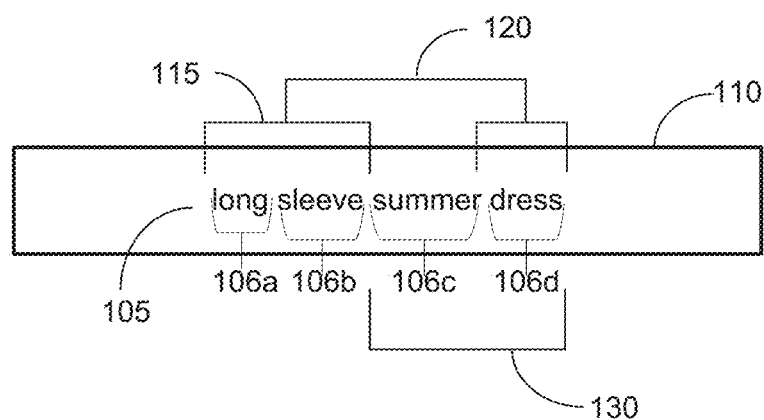
FIG. 1 shows an exemplary query string 105 that may be entered into a text field.

Reference will now be made in detail to specific example embodiments for carrying out the inventive subject matter. Examples of these specific embodiments are illustrated in the accompanying drawings. It will be understood that these examples are not intended to limit the scope of the claims to the illustrated embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details.

Query segmentation may be one component for understanding user's search intent in information retrieval tasks. It may involve grouping tokens in the search query into meaningful phrases which help downstream tasks like search relevance and query understanding. Query segmentation may split a search query into meaningful contiguous segments to assist search precision and retrieval tasks. Search engines may fetch high quality and most relevant results when they are able to identify the important phrases in the search query which need to be kept together for quality results. One way to achieve this is if the user is explicit about the phrases by adding quotes around the segments of the search query to indicate phrases. But this is hardly the pattern you see in real world search logs. Users expect the search engine to infer and understand these phrases. This ends up degrading precision in most cases where the phrase as a whole is important to be kept together during retrieval like move name, song title, brands, etc. Consider a shopper looking for a long sleeve summer dress. The shopper may be looking primarily for a summer dress which has long sleeves. The underlying search engine needs to know that the query is for a dress and specifically for a summer wear, which has long sleeves as an additional feature of the dress. The search experience is different if a user searches with quotes around the segments—"long sleeve" "summer" "dress", the results are far from accurate if we show the user items which match long summer dress with short sleeves. Order plays a vital role in query segmentation which is lost in a bag of words model.

Word embeddings techniques such as word2vec, GloVe, and fastext may be utilized by the disclosed methods, systems, and devices to capture low dimensional space representation of words. These representations help to learn semantics while they optimize for word context with their window-based training style. Output probabilities may predict how likely it is to find each vocabulary word nearby the input word.

These word embeddings techniques are different from many other vector based models that base their predictions on past words. Instead, these models examine words before and after a target word to form a prediction. This method is known as a continuous bag of words (CBOW), in that it utilizes contiguous representations. Ordering of the words is not particularly relevant in these models. In some aspects, a skip-gram technique may be employed by the disclosed methods and system. In these aspects, a center word may be utilized to predict surrounding words.

The disclosed methods, devices, and systems may utilize this context optimization to identify possible segment boundaries in the query. Words in one segment ngram appear more often in queries in the same context compared to words which do not belong to one segment. Query embeddings are provided as input features to a classifier. For a query of N tokens, there are N−1 boundaries between the tokens. A binary classifier is trained to make these N−1 segmentation decisions. A set of training queries are extracted from query logs, and used to train query embeddings. Consider a query $Q=W_1\ W_2\ W_3\ W_4\ \ldots\ W_N$ with N tokens. The query segmentation task may be modeled as an independent decision making task to draw a segmentation break between any two words. In some aspects, for every pair of words $W_i$, $W_{i+1}$ in a query, we concatenate the 2 vectors (D dimension each) representing $W_i$ and $W_{i+1}$ into a 2D vector. This concatenated vector may then be input to the binary classifier. The binary classifier then decides to segment or not between $W_i$ and $W_{i+1}$.

In some aspects, tokens (e.g. words) within a query may be grouped based on their affinity to each other. The affinity may, in some aspects, be based on how frequently the words are grouped in previous queries by users entering the queries themselves. In some aspects, this approach recognizes that associations of words entered into a query are more likely to be relevant if those words have been provided with some adjacency in previous queries. Some approaches may rely on the use of a similarity score to determine whether two words in a query should be included in a common segment or not. For example, some approaches determine a threshold value for a similarity score of two tokens in a query. If the similarity score meets a certain criterion, the two tokens are included in the same segment, whereas if the similarity score meets a second criteria, the two tokens may be included in different query segments.

In some other implementations, a classifier may be trained based on previous queries. Annotation data may also be provided to the classifier, with the annotation data indicating to the classifier a proper segmentation for each of the queries. The annotation data may be the result of, for example, human segmentation of the queries. In some aspects, the annotation data may result from a combination of machine and human segmentation. From this training data and annotation data, the classifier may, independent of any predetermined threshold as in the similarity score implementation, learn which tokens are included in a common segment and which tokens are in different query segments. We have found the classifier approach provides superior results when compared to the similarity score approach.

For example, with one set of test data, we found the similarity score approach yielded an accuracy of 73.17%, whereas the classifier approach yielded accuracy of 79.946%. In another example, the similarity score approach yielded an accuracy of 79.419%, whereas the classifier approach yielded accuracy of 80.691%.

The disclosed methods and systems may train a word embeddings model using a set of training queries in some aspects. Word emdeddings models may be shallow, two-layer neural networks in some aspects. These models may be trained to reconstruct linguistic contexts of words. In some aspects, the training queries of the disclosed methods and systems may include queries entered by one or more web users on one or more web applications. Based on the training data, the word embeddings model may provide a similarity score between two tokens (e.g. words) in a query. The similarity score may relate to a relative frequency that those two tokens were found within a proximity of each other in the training data. For example, if two words were "often" found together in the training data (i.e. a similarity score above a predetermined threshold), the disclosed methods and systems may be less likely to segment the query such that those words are in different segments. Similarly, if two words were infrequently found within a proximity in the training data (i.e. a similarity score below or equal to the predetermined threshold), the disclosed methods and systems may, in some aspects, be more likely to segment the query such that the two words are in different query segments.

FIG. 1 shows an exemplary query string 105 that may be entered into a text field 105. The query string 105 includes a plurality of tokens 106a-d. Tokens may be two or more contiguous characters within the query that are separated from other characters of the query by one or more characters in a set of token delimiters. Characters in the set of token delimiters may vary by embodiment but may include one or more non-alpha-numeric characters. For example, the token delimiters may include one or more of a space, semicolon, comma, forward slash, backward slash, or other characters. In the example of FIG. 1, the tokens are equivalent to words in the query, which include the words "long," "sleeve," "summer," and "dress."

The methods and systems disclosed herein determine which of the identified tokens 106a-d have greater affinity to each other than other tokens in the query string 105. For example, FIG. 1 illustrates that the words "long" and "sleeve" may be logically grouped together into group 115, while "sleeve" and "summer" may be placed in separate groups 150 and 130. "Summer" and "dress" may also be associated into group 130, as well as "long sleeve" and "dress" may be associated in group 120.

Figure 2:
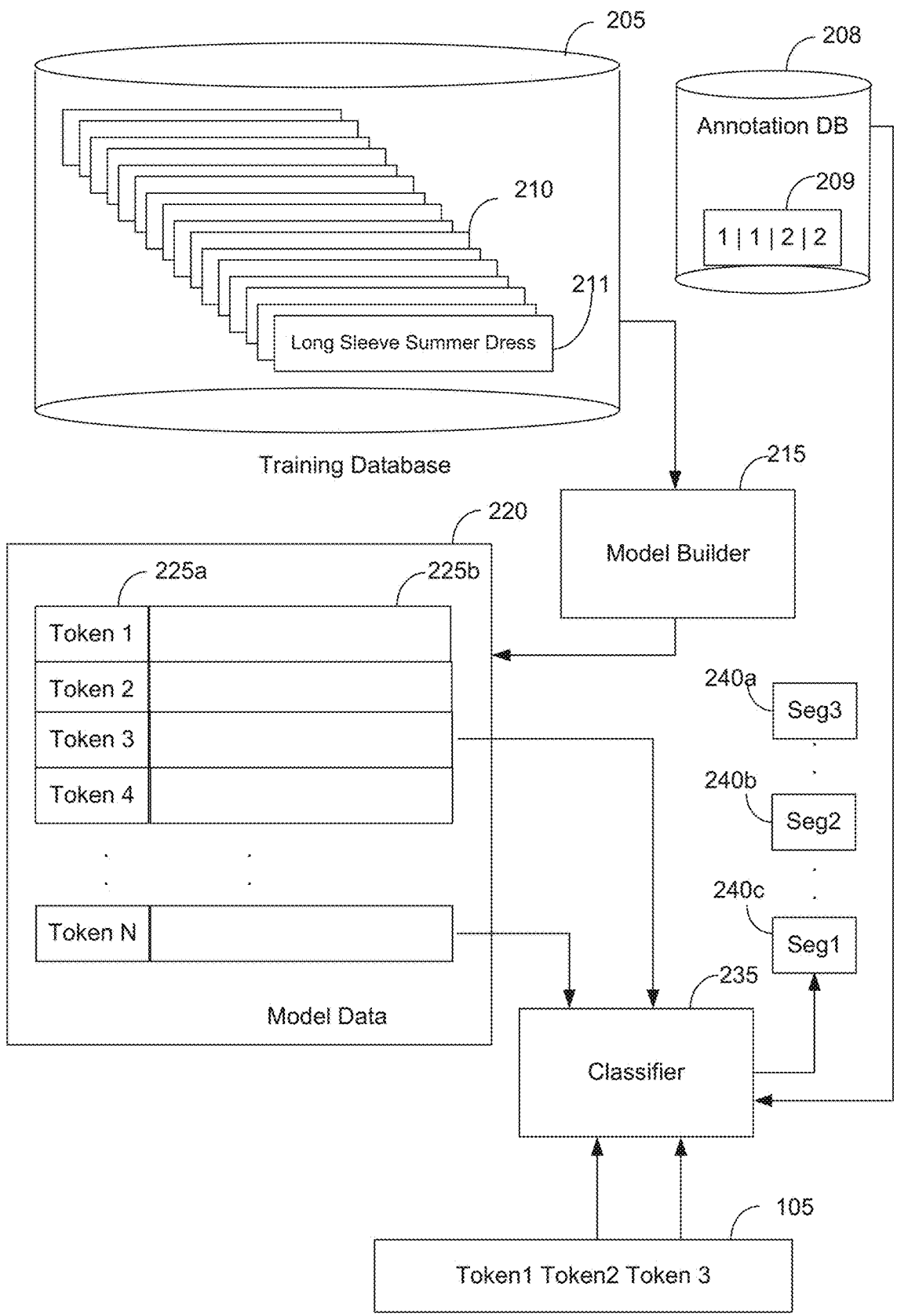
FIG. 2 is an exemplary data flow diagram for a query segmentation system.

FIG. 2 is an exemplary data flow diagram for a query segmentation system 200. FIG. 2 shows a training database 205. The training database may include a plurality of training queries 210. The training queries 210 may be taken from a variety of sources, including, for example, previous queries entered by users of one or more web sites. The training queries 210 include an example query 211, as "long sleeve summer dress." The training queries 210 are read from the training database 205 by a model training process 215 to generate a model data set 220. In some aspects, the model training process 215 may be word2vec or GloVe in various aspects. The model builder 215 may utilize a vector space model to represent positions of tokens in a continuous vector space.

FIG. 2 also illustrates an annotation database 208. The annotation database 208 may define a "proper" query segmentation for the queries 210 provided in the training database 205. In other words, in some aspects, the proper query segmentation stored by the annotation database 208 may be determined via human review of the queries 210 in the training database 205. In other aspects, the proper query segmentation for the queries 210 of the training database 205 may be determined based on click through results of query results for the queries 210 in the training database.

FIG. 2 shows an example annotation data 209 for the example query 211. Annotation data 209 shows that two query segments are identified by the annotation 209 for the example query 211. In the example annotation data 209, an ordinal position of a number in the annotation data 209 identifies a query segment for a token in the example query 211 having an equivalent ordinal position. Thus, annotation data 209 indicates that the first two tokens of the example query 211 (i.e. "long," and "sleeve") In some aspects, the query segmentation provided by the annotation database 208 may be at a level of accuracy that the disclosed methods and systems are designed to achieve.

In some aspects, the word embeddings model 220 generated from the training queries 210 may utilize a vector size of three hundred (350). Other vector sizes are contemplated for use within the disclosed methods and systems. A minimum vector size may be five (5) in some aspects, but other minimum vector sizes are also contemplated for use in the disclosed methods and systems.

In some aspects, the model builder 215 may be tuned by the disclosed methods and systems to map words that are more likely to occur within a proximity of each other in queries of the training database 205 to nearby points in the vector space.

In various aspects, the number of training queries 210 may vary. In some aspects, the number of training queries may be as low as 1500. In some aspects, the number of training queries may be 30,000. In other aspects, the number of training queries may be 36 million. Numbers of training queries within the range of 1500 to 36 million, or above or below this range are also contemplated.

The model data 220 includes a plurality of records 225, each record including at least a representation of a token 225a and a corresponding vector representation 225b for the token 225a in the vector space. Each token 225a in the model data 220 may be present in the training database 205

After the model database 220 is created, a classifier 235 may be trained based on the model data 220 and the annotation data 208. For example, by scanning the model data 220, the classifier may determine how closely related the tokens 225a are to each other based on the model data 225b. Additionally, in some aspects, the annotation data 208 provides indications of segmentation for the queries provided in the training data 205. From this information, the classifier may determine which tokens provided by the training data 205 may be included together in a segment and which tokens may be included in different segments. This segmentation may vary for the same tokens depending on context, such as other tokens present in a particular query. In some aspects, the classifier may iterate on the model data. For example, in some aspects, twenty (20) iterations may be utilized to train the classifier. Other numbers of iterations are also possible in other aspects.

The classifier 235 may then be utilized to segment "new" queries (for example, queries input to a web page). When a subject query 105 is received, the model data 220 is provided to a classifier 235, along with the tokens of the new query 105. The classifier 235 segments the query 105 into multiple segments 240a-c based on the model data 220 and in some aspects, the annotation data 208. For example, in some aspects, the classifier may identify a first and second token included in the subject query 105. The classifier 235 may determine whether the two tokens are closely related based on the model data 220 and the annotation data 208. For example, their relation may be based on how frequently the two tokens occurred in proximity to each other in the training data 210. In some aspects, their relation may be based on how the tokens are segmented or not segmented based on the annotation data 208.

Vector representations 225b for the first and second tokens may be identified in the model data 220 via the association between the token representations 225a and the vector representations 225b, as well as the individual first and second tokens. For example, in some aspects, the token representations 225a may be equivalent to string representations of tokens, which can be compared against the tokens in the subject query 105. In some aspects, the token representations 225 may be hash values for tokens. In these aspects, tokens in the subject query 105 may be hashed and then compared against the token representations 225a in the model database 220 to identify the vector representations 225b for the tokens in the subject query 105.

The model builder 215 and classifier 235 shown in FIG. 2 may include, separately or in an integrated fashion, one or more hardware processors that are configured to execute instructions that may be stored in an electronic hardware memory. Exemplary implementations are discussed further below.

Figure 3A:
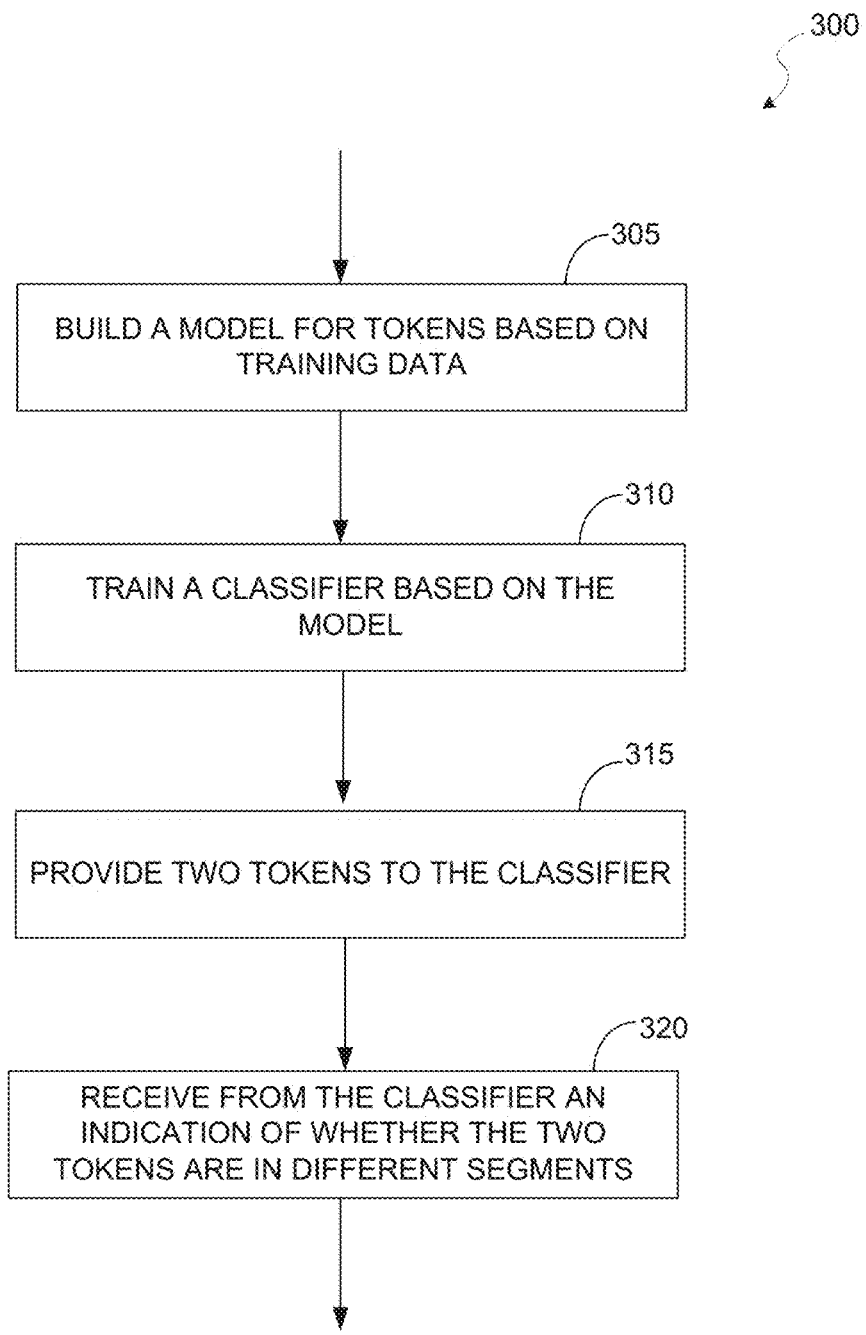
FIG. 3A is a method of utilizing a classifier to segment a query.

FIG. 3A is a flowchart of an exemplary method of utilizing a classifier to segment a query. In some aspects, the process 300 discussed below with respect to FIG. 3A may be performed by one or more hardware processors. For example, in some aspects, an electronic memory may store instructions for the one or more hardware processors that configure the one or more hardware processors, when executed, to perform one or more of the functions discussed below with respect to FIG. 3A. For example, instructions in the query classifier 635, discussed below with respect to FIG. 6, may configure a processor, such as processing unit 706 of FIG. 7 and/or one or more of processors 810 of FIG. 8, to perform one or more of the functions discussed below with respect to FIG. 3A.

In block 305, a model is built for tokens based on training data. In some aspects, the tokens may be included in queries that are part of the training data. As discussed above with respect to FIG. 2, the training data 205 may include queries recorded previously as entered in one or more web sites or applications. The queries may have been generated by human users of the web sites. In some aspects, the model may be built by word2vec or GloVe. These models map tokens (e.g. words) to a multi-dimensional vector space. In some aspects, genism word2vec wrapper may be utilized to build the model. In some aspects, a context window between two and three (2-3) may be utilized. A smaller context model may be shown to learn better embeddings for queries, especially for the segmentation task. In some aspects, a vector dimension of the model may be set to 300. However, other dimensions are contemplated, such as 100, 200, 225, 250, 275, 325, 350, 400, or any number in the range of 1-5000. When 300 is used as a dimension for the vector, a combined vector of 600 is formed when two vectors are concatenated (the two vectors representing two tokens from a query). This combined vector becomes an input feature vector for the classifier, as discussed below.

In block 310, a classifier is trained based on the model. The training of the classifier enables the classifier to determine relationships between tokens in the training data of block 305. In some aspects, a binary classifier may be used. For example, the classifier may determine whether two tokens, taken together, have a qualitative property. The qualitative property may indicate whether, for example, the two tokens are in a common query segment or not. In some aspects, the classifier may be Logistic Regression or XGBoost. In some aspects, gradient boosting machines may be utilized for the classification.

In block 315 two tokens are provided to the classifier. For example, after the classifier has been trained, the classifier may be used to determine how to segment a query including multiple tokens. For example, if two tokens provided to the classifier in block 310 are relatively frequently found to be associated in the training data, the classifier may identify this association when provided with those two tokens again. Alternatively, if two other tokens are generally not associated in the training data, then when provided with these two other tokens, the classifier may determine the two other tokens are not associated, and thus may be in different query segments. In some aspects, block 315 may be included in block 470 of FIG. 4, discussed below.

In block 320, the classifier determines whether the two tokens are to be included in different segments, or a single segment based on the classifier's training. For example, in some aspects, the classifier may have been trained on annotated training data that identifies segment boundaries for the training data provided to the model.

In various aspects, one or more of the blocks of process 300 may not be present. For example, in some aspects process 300 may not include blocks 315 and/or 320.

Table 1 below shows segmentation and query accuracies when utilizing process 300 discussed above. For the benchmarking shown in table 1, a naïve query segmentation model is built over a test data set. Table 1 shows that simple logistic regression on the embeddings vector provides a better result than a raw ngram frequency boosting technique. Some aspects may utilize a model that boosts segments using Wikipedia Titles, but this was not utilized to generate the results shown in Table 1:

TABLE 1

| Method | Segmentation Accuracy | Query Accuracy |
|---|---|---|
| Naïve n-gram | 0.677 | 0.351 |
| Logistic Regression | 0.731 | 0.418 |

Google's word2vec released pretrained word embedding vectors on Google News. These pretrained embeddings were built on data set which has about 100 billion words, and three million words and phrases, each having a 300 dimension vector. We examined the idea of transfer learning to use these pretrained embeddings (from the Google news data corpus) for web query segmentation. We follow a similar process as when the embeddings model was train from scratch. These pretrained vectors act as features for each word in a query. They are concatenated and feed to a classifier. In some aspects, XGBoost may be used as the classifier. A grid search may be performed to determine the best hyper-parameters for depth of the tree and number of estimators. This process may be repeated but using pre-trained GloVe vectors on common crawl and facebook fasttext pretrained model over a Wikipedia corpus with 2.5 M word vocabulary. Table 2 shows the experimental results of this analysis. The best performance is achieved with Glove web crawl pretrained embeddings.

TABLE 2

| Word Vectors | Segmentation Accuracy | Query Accuracy |
| --- | --- | --- |
| GloVe web crawl | 0.811 | 0.552 |
| GloVe web crawl average | 0.781 | 0.497 |
| Google News word2vec | 0.797 | 0.523 |
| Facebook Fasttext Wikipedia | 0.806 | 0.548 |
| Word2vec model on AOL corpus | 0.804 | 0.54 |

Figure 3B:
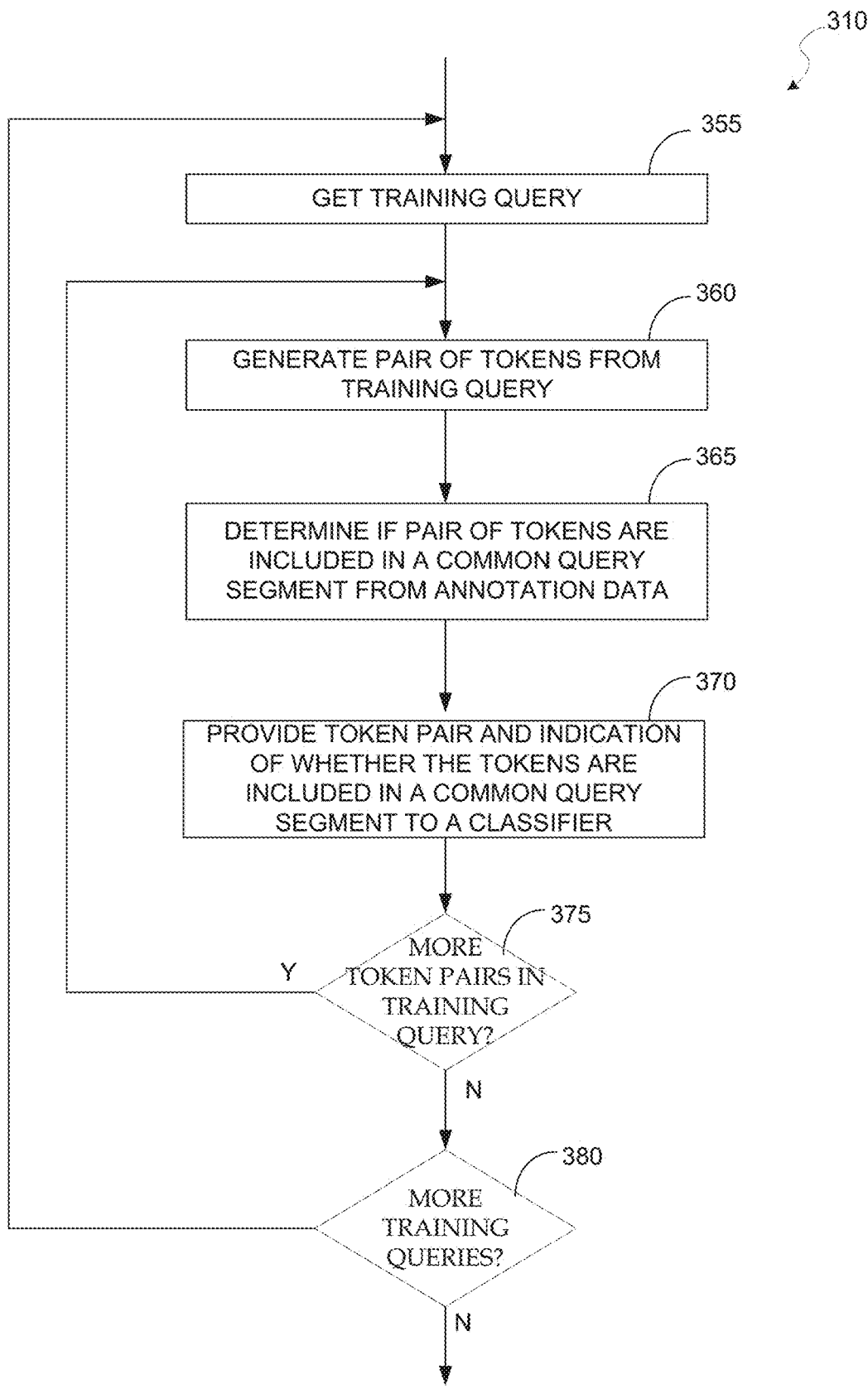
FIG. 3B is a flowchart of a method of training a classifier.

FIG. 3B is an exemplary method of training a classifier. In some aspects, the process 310 discussed below with respect to FIG. 3B may be performed by one or more hardware processors. For example, in some aspects, an electronic memory may store instructions for the one or more hardware processors that configure the one or more hardware processors, when executed, to perform one or more of the functions discussed below with respect to FIG. 3B. For example, instructions in the query classifier 635, discussed below with respect to FIG. 6, may configure a processor, such as processing unit 706 of FIG. 7 and/or one or more of processors 810 of FIG. 8, to perform one or more of the functions discussed below with respect to FIG. 3B.

In block 355, a training query is obtained. In some aspects, the training query is obtained from the training database 205. The training query may include a plurality of tokens, such as words or symbols separated by a token delimiter.

In block 360, a pair of tokens is generated from the training query. For example, a query may have n tokens. Block 360 may select any two of the n tokens to form a pair. Multiple iterations of block 360 may each generate unique token pairs.

Block 365 determines whether the two tokens of block 360 are included in a common query segment or not. For example, in some aspects, the annotation data 208 may identify query segments within the training query obtained in block 355. The query segments identified by the annotation data may each include portions of the training query, such that every token in the training query is assigned or allocated to a particular query segment by the annotation data. Block 365 determines whether the two tokens are included in a single query segment of the query segments of the training query.

Block 370 provides the token pair and an indication of whether the two tokens in the pair are included in a common query segment to a classifier. In some aspects, the classifier is a binary classifier. In some aspects, the classifier may be Logistic Regression or XGBoost. In some aspects, gradient boosting machines may be utilized for the classification. Decision block 375 determines whether there are more unique token pairs in the training query obtained in block 355. If so, processing returns to block 355 and a new unique pair of tokens is obtained from the training query. Otherwise, process 310 moves to decision block 380, which determines whether there are additional training queries available in a database of training queries, such as the database 205 discussed above. If no additional training queries are available, training of the classifier may be complete. Otherwise, processing returns to block 355, and an additional training query is obtained from the training database.

Figure 4:
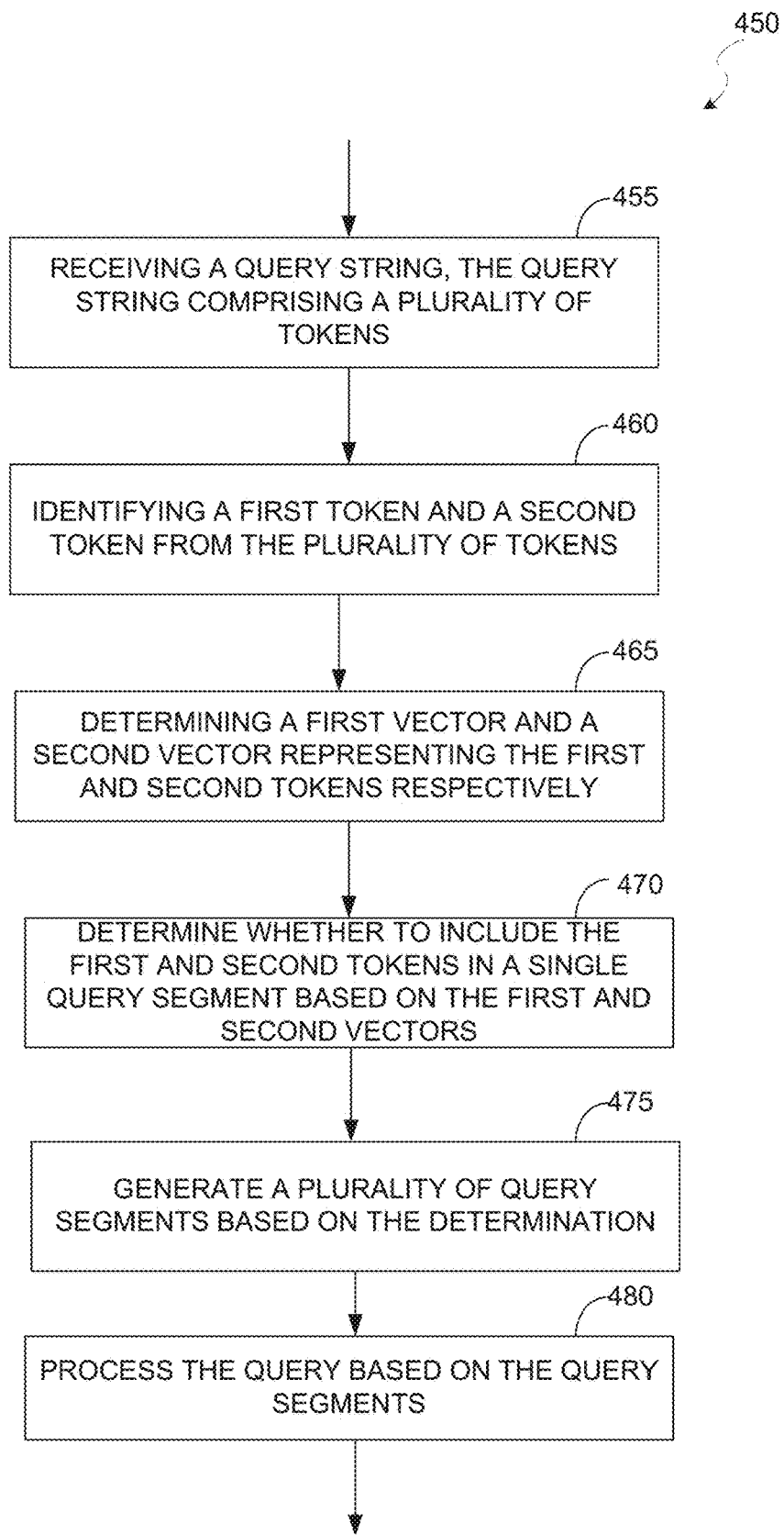
FIG. 4 is a flowchart of a method of query segmentation.

FIG. 4 is a flowchart of an exemplary method of query segmentation. In some aspects, the process 450 discussed below with respect to FIG. 4 may be performed by one or more hardware processors. For example, in some aspects, an electronic memory may store instructions for the one or more hardware processors that configure the one or more hardware processors, when executed, to perform one or more of the functions discussed below with respect to FIG. 4. For example, in some aspects, instructions stored in the query classifier 635, discussed below with respect to FIG. 6, may configure one or more hardware processors to perform one or more of the functions discussed below with respect to FIG. 4. In some aspects, the instructions of the query classifier 635 may be equivalent to the instructions 708 illustrated in FIG. 7 and/or instructions 816 and/or 818 illustrated in FIG. 8. These instructions may configure the processor 706 of FIG. 7 and/or one or more of the processors 810 of FIG. 8 to perform one or more of the functions discussed below with respect to FIG. 4. In some aspects, the instructions 816 may configure one or more of the processor 810 to perform one or more of the functions discussed below with respect to FIG. 4.

In block 455, a query string is received. In some aspects, the query string may be received from a computer network. For example, in some aspects, the query string may be received in the form of an http post transaction. In some other aspects, the query string may be received from a data store, such as a database or file system. In some aspects, the query string may be received from an application programming interface. For example, the query string may be in input parameter to a method. The method may be exposed via an API as part of a service oriented architecture, for example, via SOAP or rest protocols.

The query string includes a plurality of tokens. In some aspects, the tokens are words or terms. The tokens may be separated by one or more characters that are included in a set of token delimiters. Token delimiting characters may include, for example, one or more of a non-alphanumeric character, a space, a comma, a semicolon, a forward slash, or a backward slash.

In block 460, a first token and a second token are identified from the plurality of tokens of the query string. In some aspects, block 460 may include parsing the query string to identify the tokens.

In block 465, a first vector and a second vector representing the first and second tokens respectively is identified. As described above with respect to FIG. 2, in some aspects, a model may be trained to associate tokens with vectors, each vector representing its respective token's relative position in a vector space. Block 465 may identify the first and second vectors based on their association with the first and second tokens respectively in a database, such as the model database 220 shown in FIG. 2.

Block 470 determines whether the first and second tokens are included in a single query segment based on the first and second vectors. In some aspects, the first and second vectors may be padded to generate first and second features respectively. The first and second features may then be provided to a classifier. The classifier may determine whether to include the first and second tokens in the single query segment. For example, in some aspects, whether to include the first and second tokens in a common query segment may be based on a distance between the first and second vectors in a multi-dimensional vector space of the model. The classifier may have previously been trained using a database of training queries.

In block 475, the query string is segmented based on the determination. In some aspects, the first and second tokens may be placed in different query segments if a distance between the first and second vectors is above a predetermined threshold. In some other aspects, distances between tokens of the query received in block 455 may be grouped based on distances between their respective vectors. For example, tokens with vectors within a predetermined threshold distance of each other may be grouped. This may result in two or more groups of tokens. Each group may define tokens of a unique query segment. Cluster analysis may be utilized to determine the groups in some aspects. For example, a density based clustering model may be utilized in some aspects.

Block 480 processes the query based on the query segments generated in block 475. In some aspects, processing the query may include searching one or more databases based on the query segments and returning results of the query. In some aspects, processing the query may include identifying a dominant query segment, and other non-dominant query segment(s). Processing the query may further include searching a database (e.g. 626 discussed below) based on the identified dominant query segment. In some aspects, one or more of the non-dominant query segments may be excluded from the search of the database. The results of the query may be returned to, for example, a user performing the query. For example, if the query received in block 455 was provided via a web interface, block 480 may include generating a results page, and transmitting the results page over a network to a client computer. The client computer may then display the results page to a user. Alternatively, in some aspects, results may be returned via an application programming interface, for example, as an output parameter to a method call. As discussed above, in some aspects, a SOAP or rest enabled method may provide results of the query as an output parameter.

Figure 5A:
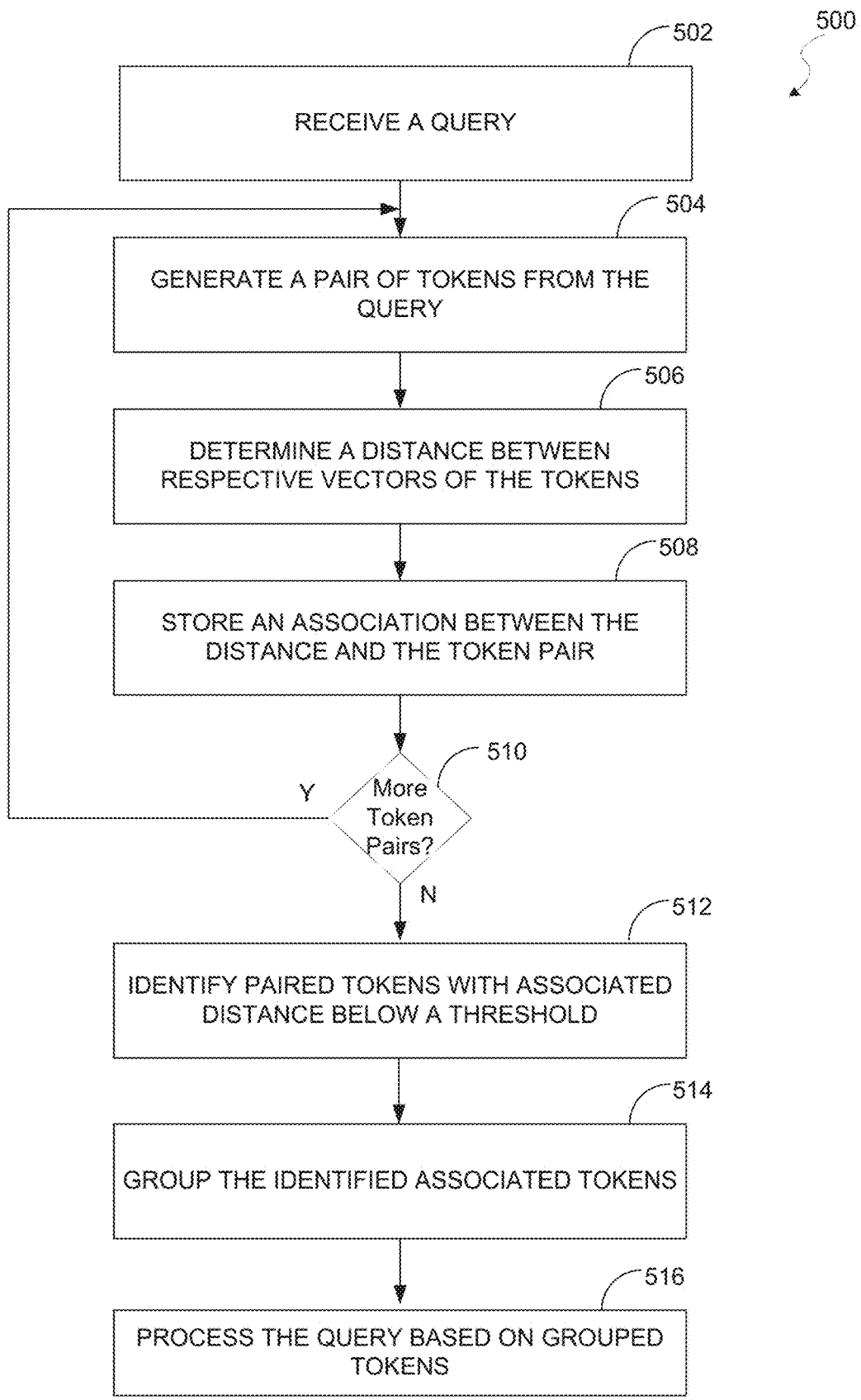
FIG. 5A is a flowchart of an exemplary method of query segmentation.

FIG. 5A is a flowchart of an exemplary method of query segmentation. In some aspects, the process 500 discussed below with respect to FIG. 5A may be performed by one or more hardware processors. For example, in some aspects, an electronic memory may store instructions for the one or more hardware processors that configure the one or more hardware processors, when executed, to perform one or more of the functions discussed below with respect to FIG. 5A. For example, in some aspects, instructions in the query classifier 635, discussed below with respect to FIG. 6, may configure one or more of the processors 810 and/or processing unit 706 to perform one or more of the functions discussed below with respect to one or more of FIGS. 3-5.

In block 502, a query is received. For example, in some aspects, a query including a plurality of tokens may be received, such as query 105 illustrated in FIG. 1. In some aspects, the query may be received from a client device 610, discussed below, and received by an application server 640, running a query classifier 635, also discussed below.

In some aspects, the query string may be received from a computer network. For example, in some aspects, the query string may be received in the form of an http post transaction. In some other aspects, the query string may be received from a data store, such as a database or file system. In some aspects, the query string may be received from an application programming interface. For example, the query string may be in input parameter to a method. The method may be exposed via an API as part of a service oriented architecture, for example, via SOAP or rest protocols.

In some aspects, the tokens are words or terms. The tokens may be separated by one or more characters that are included in a set of token delimiters. Token delimiting characters may include, for example, one or more of a non-alphanumeric character, a space, a comma, a semicolon, a forward slash, or a backward slash.

In block 504, a pair of tokens is generated from the query. In other words, two tokens of the query are associated in a pair relationship. In some aspects, only adjacent tokens may be associated in a pair. In some other aspects, only tokens within a threshold number of tokens may be associated as a pair. For example, in these aspects utilizing a threshold number of tokens of two (2), the received query may include one other token between two tokens of the pair.

In block 506, a distance within a multi-dimensional vector space is determined. Block 506 may include determining vectors corresponding to each of the tokens included in the pair of block 504. The vectors may be identified from a model database such as model database 220 described above with respect to FIG. 2.

In block 508, an association between the distance and the token pair is stored. This information may be stored for later processing, as described below. Decision block 510 determines whether there are additional unique token pairs available from the query received in block 502. If so, process 500 returns to block 504 and a new token pair is generated. Otherwise, block 512 identifies paired tokens with an associated distance below a threshold. A relatively low distance between token pairs (i.e. distance below a predetermined distance threshold) may indicate these tokens should be included within a single query segment.

In block 514, the identified associated tokens are grouped. In some aspects, cluster analysis may be utilized to group the identified associated tokens. For example, if the query received in block 502 includes tokens a, b, c, d, e, f, and each of tokens a, b, and c have a distance of three units from each other, and each of tokens d, e, f, have a distance of three units from each other, but a, b, c each have a greater distance to any of d, e, or f, then two groups may be formed. One group may include tokens a, b, c, while the other group includes tokens d, e, f. These two groups may form two or more query segments.

Block 516 processes the query based on the grouped tokens of block 514. In some aspects, processing the query may include searching one or more databases (e.g. 626 discussed below) based on the query segments and returning results of the query. In some aspects, processing the query may include identifying a dominant query segment, and searching a database based on the identified dominant query segment. In some aspects, one or more of the non-dominant query segments may be excluded from the search of the database. In some aspects, non-dominant query segments may define attributes of an article being searched for, while a dominant query segment may identify the article itself, for example, via a name or product number of the article.

In some aspects, block 516 may include placing quotes around each query segment, and searching a database based on the quoted query. For example, if the query of block 502 is "long sleeve summer dress," block 516 may process this query as "long sleeve" "summer dress" after block 514 groups "long" and "sleeve" into a first query segment, and block 514 groups "summer" and "dress" into a second query segment. Other approaches for the use of segmented queries are also contemplated, some of which may be known in the art.

The results of the query may be returned to, for example, a user performing the query. For example, if the query received in block 502 was provided via a web interface, block 516 may include generating a results page, and transmitting the results page over a network to a client computer. The client computer may then display the results page to a user. Alternatively, in some aspects, results may be returned via an application programming interface, for example, as an output parameter to a method call. As discussed above, in some aspects, a SOAP or rest enabled method may provide results of the query as an output parameter.

Figure 5B:
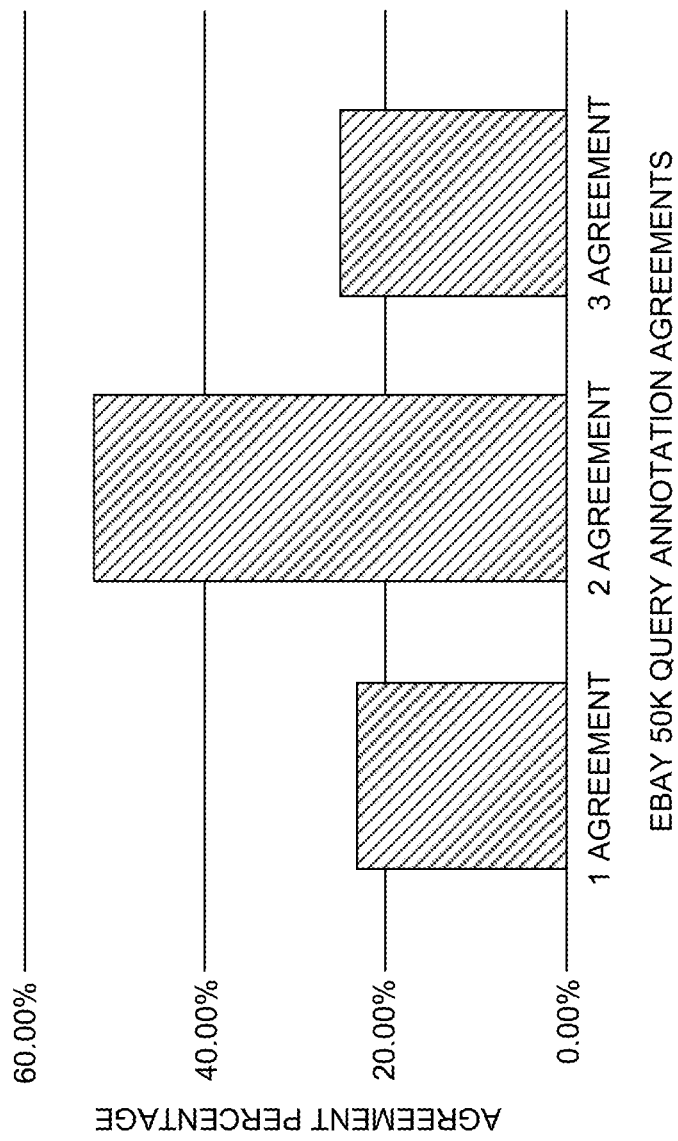
FIG. 5B is a graph showing annotator agreement distribution for some of the disclosed aspects.
Figure 5C:
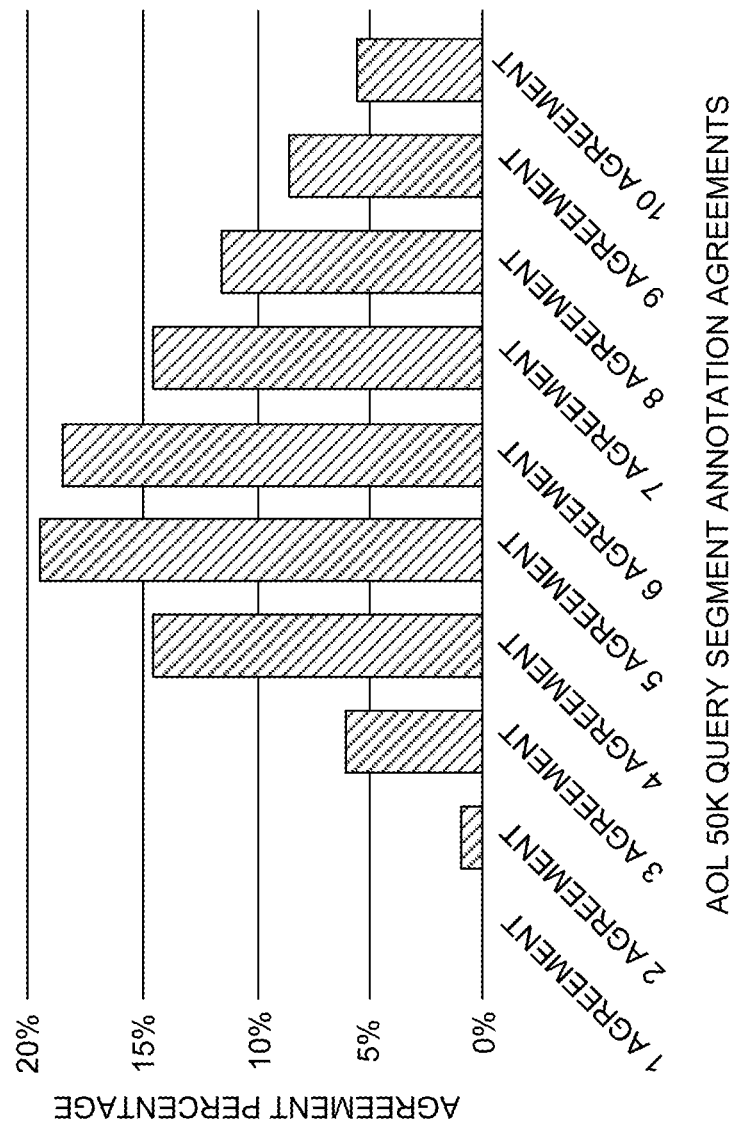
FIG. 5C shows annotator agreement for an AOL dataset.

FIG. 5B is a graph showing annotator agreement distribution for some of the disclosed aspects. To determine query segmentation accuracy of the disclosed methods and systems, we annotated a 50,000 query set sampled across a top 15,000 eBay categories over a period of 3 months. Each query received three (3) annotations each with meaningful segments keeping search relevance in mind. For precision, the annotators were asked to verify the segmented query on eBay's search engine to ensure quality of results improve post segmentation. FIG. 5B shows the annotator agreement distribution. We observed agreement by two or more annotators on approximately 78% of queries whereas all three annotators agree approximately 25% of the time. Query segmentation has some ambiguity in that it may reflect a difference of opinion in annotations from annotator to annotator. The low percentage of agreement by all three annotators indicates segmentation tasks can be subjective. To train the model, in some aspects of the methods, systems and devices discussed above, we utilize annotations where at least two out of three annotators are in agreement. FIG. 5C shows annotator agreement for an AOL dataset.

Some aspects of the disclosed systems, methods and devices utilize 80% of the eBay query set for training and the remaining 20% for test. The 80% training portion may be further split in some of these aspects into an 80% train and 20% validation set. Some aspects learn query embeddings using fasttext followed by training an XGBoost classifier for predicting the segmentation breaks. A grid search for hyper parameter tuning may provide the best segmentation accuracy using a skip-gram model having 500 estimators and with a depth of four (4) on the XGBoost model. A contiguous bag of words (cbow) model having 800 estimators with a depth of six (6) also provided good results. In fact, the best numbers for both query accuracy and segmentation accuracy we found using the cbow architecture. Table 3 below summaries the accuracies for the naïve ngram model and our approach. The accuracy we obtain on the eCommerce data using our technique clearly beats the naïve ngram based segmentation model. These numbers are also comparable with the embeddings experience which utilized AOL queries.

TABLE 3

| Method | Segmentation | Query Accuracy |
|---|---|---|
| Naïve n-gram | 0.713 | 0.578 |
| Fasttext skip-gram + XGBoost | 0.796 | 0.677 |
| Fasttext cbow + XGBoost | 0.799 | 0.683 |

Figure 6:
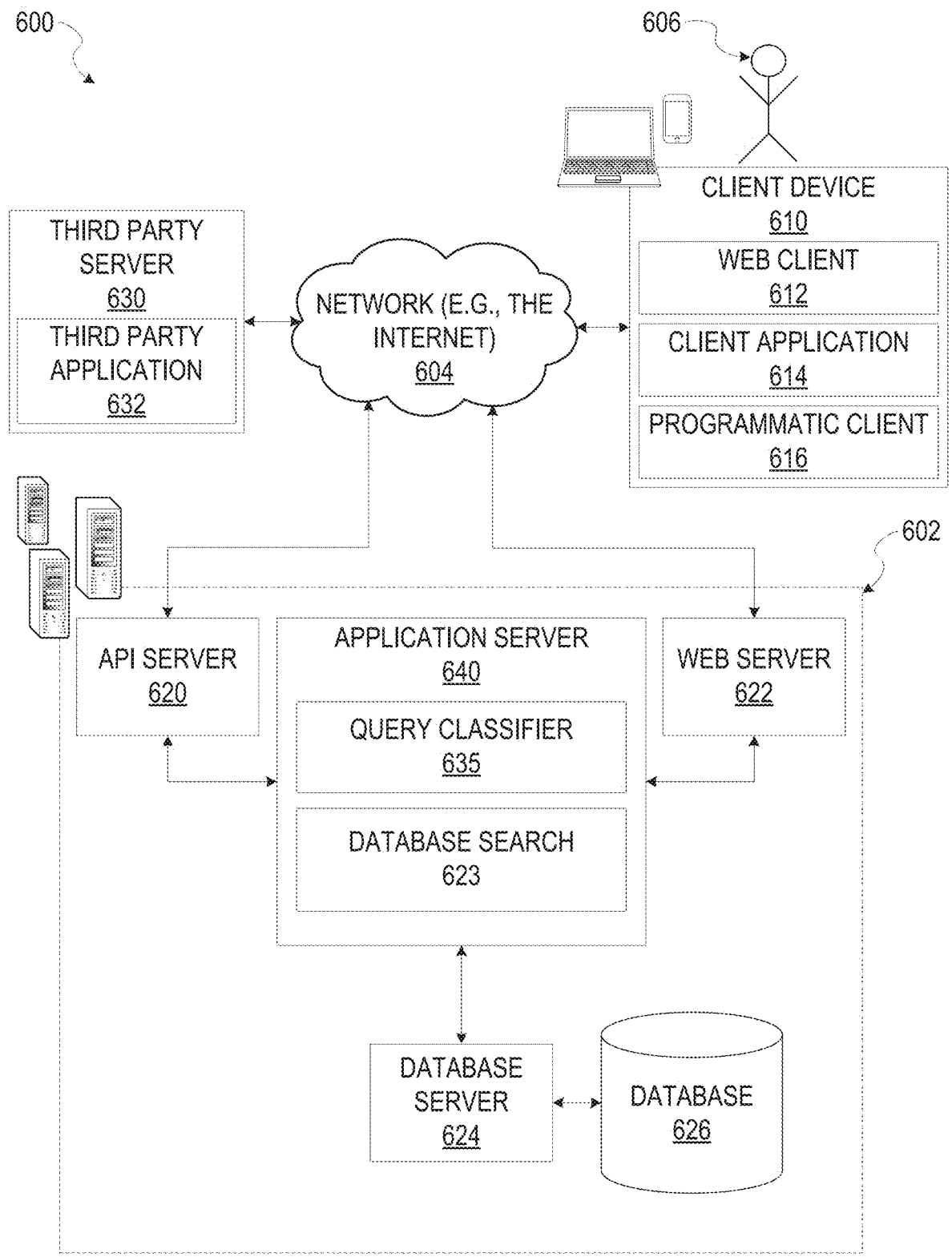
FIG. 6 is network diagram illustrating a network environment in which the visualization system may operate, according to example embodiments.

FIG. 6 is a block diagram of an exemplary client-server-based architecture 600. While FIG. 6 depicts the client-server-based architecture 600, the present inventive subject matter is, of course, not limited to such an architecture, and could equally well find application in an event-driven, distributed, or peer-to-peer architecture system, for example. Further, to avoid obscuring the inventive subject matter with unnecessary detail, various functional components that are not germane to conveying an understanding of the inventive subject matter have been omitted from FIG. 6. Moreover, it shall be appreciated that although the various functional components illustrated in FIG. 6 are discussed in a singular sense, multiple instances of any one of the various functional components may be employed.

A content publication platform 602, in the example form of a network-based system, provides server-side functionality via a network 604 (e.g., the Internet or wide area network (WAN)) to one or more client devices 610. FIG. 6 illustrates, for example, a web client 612 (e.g., a browser), a client application 614, and a programmatic client 616 executing on the client device 610. The client device 610 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the content publication platform 602. In some embodiments, the client device 610 may comprise a display module (not shown) to display information (e.g., in the form of user interfaces). In further embodiments, the client device 610 may comprise one or more of a touch screens, accelerometers, gyroscopes, cameras, microphones, global positioning system (GPS) devices, and so forth. In one embodiment, the content publication platform 602 is a network-based marketplace that publishes publications (e.g., web documents) comprising item listings of products available on the network-based marketplace.

One or more users 606 may be a person, a machine, or other means of interacting with client device 610. In example embodiments, the user 606 is not part of the client-server-based architecture 600, but may interact with the client-server-based architecture 600 via the client device 610 or another means. For example, the user 606 may provide input (e.g., touch screen input or alphanumeric input) to the client device 610, and the input is communicated to the content publication platform 602 via a network 604. In this instance, the content publication platform 602, in response to receiving the input from the user 606, communicates information to the client device 610 via the network 604 to be presented to the user 606. In this way, the user 606 can interact with the content publication platform 602 using the client device 610.

The client device 610 may include one or more client applications 614 (also referred to as "apps") such as, but not limited to, a web browser, messaging application, electronic mail (email) application, an e-commerce site application (also referred to as a marketplace application), and the like.

In some embodiments, if the e-commerce site application is included in the client device 610, then this application is configured to locally provide the user interface and at least some of the functionalities with the client application 614 configured to communicate with the content publication platform 602, on an as needed basis, for data or processing capabilities not locally available (e.g., access to a database of items available for sale, to authenticate the user 606, to verify a method of payment, etc.). Conversely if the e-commerce site application is not included in the client device 610, the client device 610 may use its web browser to access the e-commerce site (or a variant thereof) hosted on the content publication platform 102.

One or more portions of network 604 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

An application program interface (API) server 620 and a web server 622 are coupled to, and provide programmatic and web interfaces respectively to an application server 640. The application server 640 may host the query classifier 635 and a database search process 623, and each of which may be embodied as hardware, software, firmware, or any combination thereof. The query classifier 635 may include the classifier 234, discussed above with respect to FIG. 2. The database search process 623 may receive query segments from the query classifier 635 according to the disclosed embodiments. The application server 640 is, in turn, shown to be coupled to a database server 624 that facilitate access to database 626. In an example embodiment, the database 626 is a storage devices that stores information to be queried (e.g., publications or listings) by the database search process 623. The databases 626 may also store digital item information in accordance with example embodiments.

Additionally, a third party application 632, executing on a third party server 630, is shown as having programmatic access to the content publication platform 602 via the programmatic interface provided by the API server 620. For example, the third party application 632, utilizing information retrieved from the content publication platform 602, supports one or more features or functions on a website hosted by the third party.

While the query classifier 635 and database search process 623 are shown in FIG. 6 to both form part of the query platform 602, it will be appreciated that, in alternative embodiments, each of the query classifier 635 and database search process 623 may form part of a service or platform that is separate and distinct from the content query platform 602.

Figure 7:
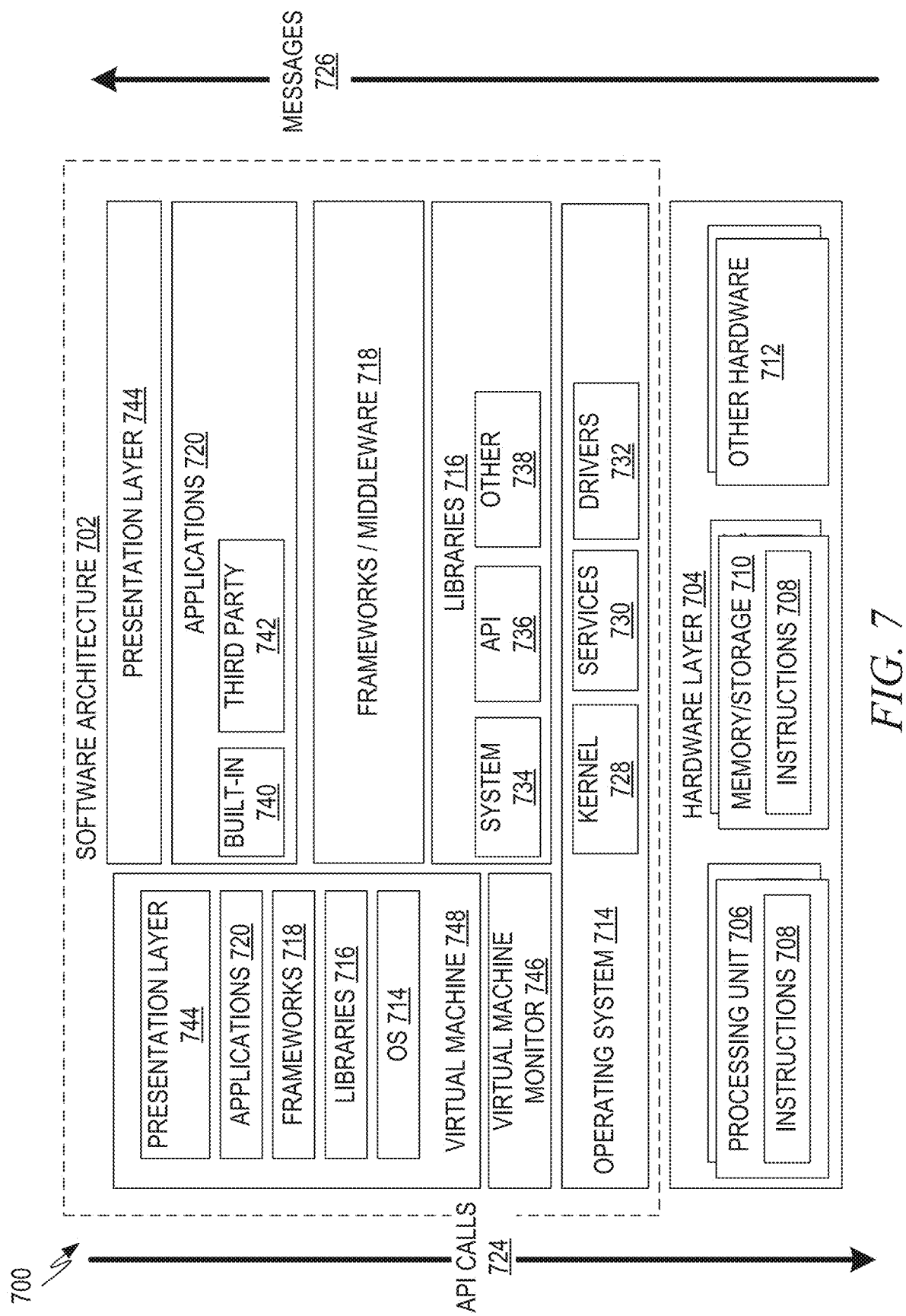
FIG. 7 is a block diagram illustrating components of a machine, according to some example embodiments, able to read instructions from a machine-readable medium and perform any of the methodologies discussed herein.

FIG. 7 is a block diagram 700 illustrating a representative software architecture 702, which may be used in conjunction with various hardware architectures herein described. FIG. 7 is merely a non-limiting example of a software architecture and it will be appreciated that many other architectures may be implemented to facilitate the functionality described herein. The software architecture 702 may be executing on hardware such as machine 800 of FIG. 8 that includes, among other things, processors 810, memory 830, and I/O components 850. A representative hardware layer 704 is illustrated and can represent, for example, the machine 800 of FIG. 8. The representative hardware layer 704 comprises one or more processing units 706 having associated executable instructions 708. Executable instructions 708 represent the executable instructions of the software architecture 702, including implementation of the methodologies and modules and so forth described above. Hardware layer 704 also includes memory and/or storage modules 710, which also have executable instructions 708. Hardware layer 704 may also comprise other hardware as indicated by 712 which represents any other hardware of the hardware layer 704, such as the other hardware illustrated as part of machine 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720 and presentation layer 744. Operationally, the applications 720 and/or other components within the layers may invoke application programming interface (API) calls 724 through the software stack and receive a response, returned values, and so forth illustrated as messages 726 in response to the API calls 724. The layers illustrated are representative in nature and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730, and/or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 520 and other software components/modules.

The frameworks/middleware 718 (also sometimes referred to as "middleware) may provide a higher-level common infrastructure that may be utilized by the applications 720 and/or other software components/modules. For example, the frameworks 718 may provide various graphic user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 includes built-in applications 740 and/or third party applications 742. Examples of representative built-in applications 740 may include, but are not limited to, a contacts application, a browser application, a book reader application, a location application, a media application, a messaging application, and/or a game application. Third party applications 742 may include any of the built in applications as well as a broad assortment of other applications. In a specific example, the third party application 742 (e.g., an application developed using the Android™ or iOS™ software development kit (SDK) by an entity other than the vendor of the particular platform) may be mobile software running on a 'mobile operating system such as iOS™, Android™, Windows® Phone, or other mobile operating systems. In this example, the third party application 742 may invoke the API calls 736 provided by the mobile operating system such as operating system 714 to facilitate functionality described herein.

The applications 720 may utilize built in operating system functions (e.g., kernel 728, services 730 and/or drivers 732), libraries (e.g., system 734, APIs 736, and other libraries 738), frameworks/middleware 718 to create user interfaces to interact with users of the system. Alternatively, or additionally, in some systems interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware machine (such as the machine of FIG. 8, for example). A virtual machine is hosted by a host operating system (operating system 714 in FIG. 7) and typically, although not always, has a virtual machine monitor 746, which manages the operation of the virtual machine as well as the interface with the host operating system (i.e., operating system 714). A software architecture executes within the virtual machine such as an operating system 714, libraries 716, frameworks/middleware 718, applications 720 and/or presentation layer 744. These layers of software architecture executing within the virtual machine 748 can be the same as corresponding layers previously described or may be different.

Figure 8:
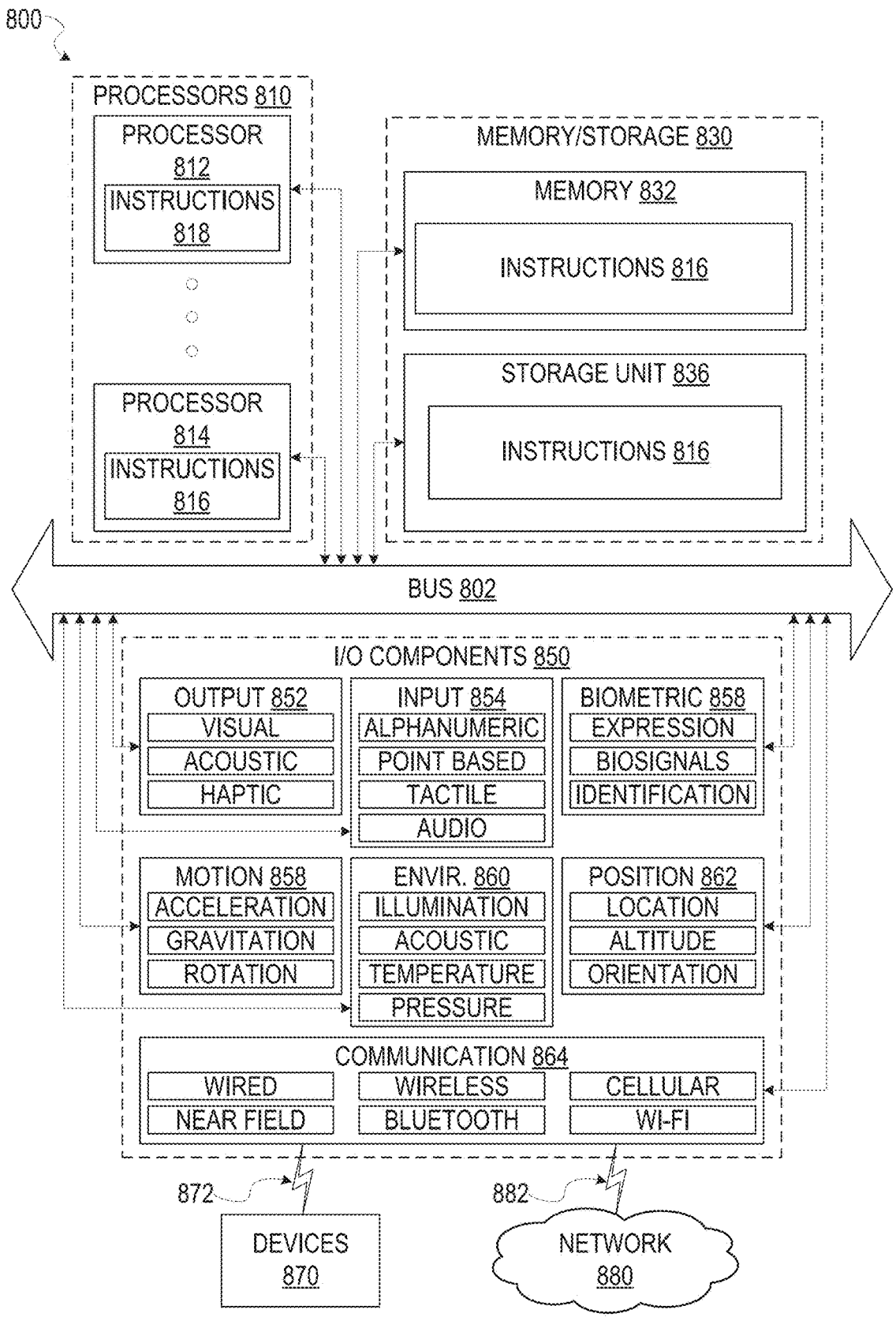
FIG. 8 is a block diagram illustrating a representative software architecture, which may be used in conjunction with various hardware architectures herein.

FIG. 8 is a block diagram illustrating components of the machine 600, according to some example embodiments, able to read instructions from a machine-readable medium (e.g., a machine-readable storage device) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. These instructions transform the general, non-programmed machine into a particular machine programmed to carry out the described and illustrated methodologies in the manner described herein. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. By way of non-limiting example, the machine 600 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory/storage 630, and/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 612 and a processor 614 that may execute the instructions 616. The term "processor" is intended to include a multi-core processor 610 that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core processor), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of the processors 610 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine (e.g., processors 610), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se. In example embodiments, a machine-readable medium may also be referred to as a "machine-readable storage device."

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), acoustic sensor components (e.g., one or more microphones that detect background noise), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672 respectively. For example, the communication components 664 may include a network interface component or other suitable device to interface with the network 680. In further examples, the communication components 664 may include wired communication components, wireless communication components, cellular communication components, near field communication (NFC) components, Bluetooth™ components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim.

We claim:

1. A computer-implemented method of segmenting a search query to identify search results, the method comprising:
   receiving a search query comprising a search query string, the search query string including at least a first token and a second token;
   identifying the first token is adjacent to the second token in the search query string;
   determining a first vector for the first token and a second vector for the second token using a word embeddings model;
   determining to include the first and second tokens in a single query segment using a binary classifier to determine a relationship between the first vector and the second vector in vector space by providing a combined vector representation of the first vector and the second vector to the binary classifier, the first and second vector being combined based on the first token being adjacent to the second token in the search query string, wherein the binary classifier is trained from a training set of queries, the queries of the training set comprising annotated query segments determined from ordinal positions of tokens within the queries, and the annotation indicating proper query segmentation; and
   processing the single query segment determined by the binary classifier to identify search results from items stored on a database.

2. The method of claim 1, wherein the combined vector representation is generated by concatenating the first vector determined for the first token and the second vector determined for the second token.

3. The method of claim 1, further comprising building the word embeddings model based on training data comprising a database of tokens, wherein the database of tokens comprises previous search queries.

4. The method of claim 3, wherein the word embeddings model is a word2vec or GloVe model.

5. The method of claim 1, wherein the binary classifier is trained based on vector representations of training search queries comprising segmented search queries having a predetermined level of segmentation accuracy.

6. The method of claim 1, wherein the binary classifier uses vector representations of only two tokens of the search query string when determining the relationship, the only two tokens comprising the first token and the second token, and the vector representations comprising the first vector and the second vector.

7. The method of claim 1, further comprising training the classifier using a contiguous bag of words (cbow) or skip-gram architecture.

8. The method of claim 1, further comprising annotating query segments to generate the annotated query segments for training the binary classifier, wherein the annotations indicate proper query segmentation and the query segments are annotated based on click-through results of previous search queries.

9. An apparatus for segmenting a search query, comprising at least one processor; and one or more —non-transitory computer-readable— media having instructions stored thereon that cause the at least one processor to:
receive a search query comprising a search query string, the search query string including at least a first token and a second token;
identify the first token is adjacent to the second token in the search query string;
determine a first vector for the first token and a second vector for the second token using a word embeddings model;
determine to include the first and second tokens in a single query segment using a binary classifier to determine a relationship between the first vector and the second vector in vector space by providing the first vector and the second vector of the adjacent tokens to the binary classifier, wherein the binary classifier is trained from a training set of queries, the queries of the training set comprising annotated query segments, the annotated query segments determined from ordinal positions of tokens within the queries, wherein the annotations of the annotated query segments indicate proper query segmentation; and
process the single query segment determined by the binary classifier to identify search results from items stored on a database.

10. The apparatus of of claim 9, wherein the word embeddings model is a word2vec or GloVe model.

11. The apparatus of claim 9, further comprising padding the first vector and the second vector to generate first and second features respectively, wherein the determination to include the first and second tokens in the single query segment is based on the first and second features.

12. The apparatus of claim 9, wherein the training set of search queries comprises comprising segmented search queries having a predetermined level of segmentation accuracy.

13. The apparatus of claim 12, wherein the binary classifier uses vector representations of only two tokens of the search query string when determining the relationship, the only two tokens comprising the first token and the second token, and the vector representations comprising the first vector and the second vector, wherein the first vector and the second vector are combined, and the combined vector is provided to the binary classifier.

14. The apparatus of claim 9, further comprising:
generating a plurality of query segments based on the first and second tokens; and
identifying, as the single query segment, a dominant query segment of the plurality of query segments, wherein the identified search results are based on searching the database with the dominant query segment.

15. The apparatus of claim 9, wherein the first and second tokens are identified in the search query string based on one or more token delimiting characters between the first token and the second token.

16. The apparatus of claim 9, further comprising annotating query segments to generate the annotated query segments for training the binary classifier, wherein the annotations indicate proper query segmentation and the query segments are annotated based on click-through results of the previous search queries.

17. A machine-readable medium comprising instructions that when executed cause one or more hardware processors to perform a method of segmenting a search query, the method comprising:
receiving, by one or more hardware processors, a search query comprising a search query string, the search query string including at least a first token and a second token;
identifying, by the one or more hardware processors, the first token is adjacent to the second token in the search query string;
determining, by the one or more hardware processors, a first vector for the first token and a second vector for the second token using a word embeddings model;
determining to include the first and second tokens in a single query segment using a binary classifier to determine a relationship between the first vector and the second vector in vector space by providing the first vector and the second vector of the adjacent tokens to the binary classifier, wherein the binary classifier is trained from a training set of queries, the queries of the training set comprising annotated query segments determined from ordinal positions of tokens within the queries, and the annotation indicating proper query segmentation; and
processing, by the one or more hardware processors, the single query segment determined by the binary classifier to identify search results from items stored on a database.

18. The machine-readable medium of claim 17, wherein the method further comprises annotating query segments to generate the annotated query segments for training the binary classifier, wherein the annotations indicate proper query segmentation and the query segments are annotated based on click-through results of the-previous search queries.

* * * * *